July 27, 1948.   H. J. McCREARY   2,445,857
MAGNETIC FREQUENCY CHANGER
Filed Nov. 23, 1944   2 Sheets-Sheet 1

INVENTOR.
HAROLD J. McCREARY
BY
ATTORNEY

July 27, 1948.  H. J. McCREARY  2,445,857
MAGNETIC FREQUENCY CHANGER
Filed Nov. 23, 1944  2 Sheets-Sheet 2
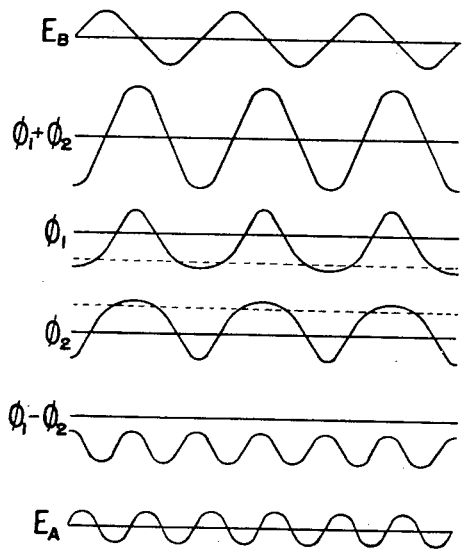
FIG. 7
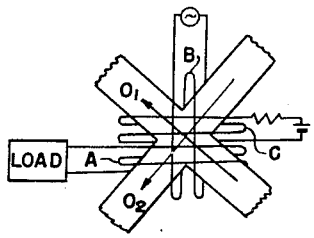
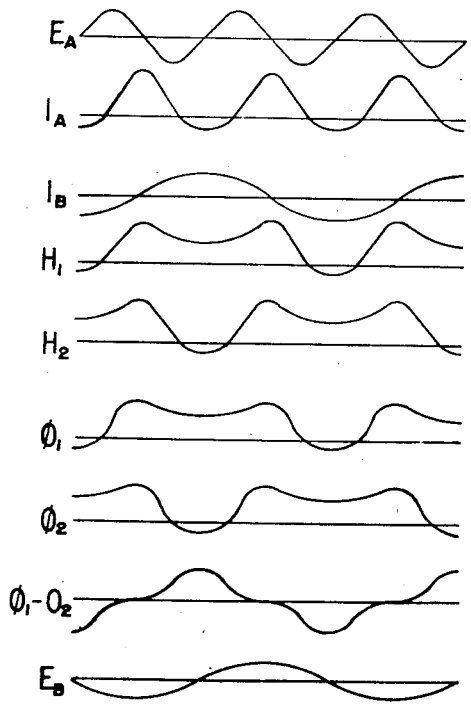
FIG. 8
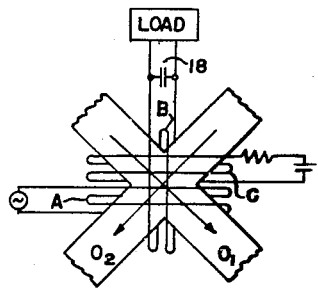
*INVENTOR.*
HAROLD J. McCREARY
BY
*ATTORNEY*

Patented July 27, 1948

2,445,857

UNITED STATES PATENT OFFICE 2,445,857

MAGNETIC FREQUENCY CHANGER

Harold J. McCreary, Lombard, Ill., assignor to Automatic Electric Laboratories, Inc., Chicago, Ill., a corporation of Delaware Application November 23, 1944, Serial No. 564,879

22 Claims. (Cl. 172—281)

My invention relates in general to frequency changers which utilize saturation of a ferromagnetic core to produce an alternating current having a frequency which is a harmonic, or subharmonic, of the frequency of an alternating current source; and in particular to improvements in the construction of the magnetic cores and in the arrangement of the electrical circuits of such frequency changers.

The principal object of my invention is to provide a self-starting subharmonic generator having a unitary magnetic structure.

Another object is to provide a frequency changer which requires a minimum number of components so as to make it compact in construction and economical to manufacture.

Still another object is to increase the efficiency of static frequency changers through the use of an improved magnetic structure which reduces the number of windings required thereon, thus lowering the copper losses; and which also reduces the winding space required, thus lowering the magnetic leakage.

A further object is to provide a magnetic structure having two magnetic flux paths which may be excited by a single primary winding and having a single secondary winding which is differentially acted upon by the flux in the two paths.

A still further object is to provide a frequency changer in which the input frequency is eliminated in the output circuit and in which the output frequency is eliminated in the input circuit by locating a single input and a single output winding on a common magnetic core in such a manner as to provide zero average mutual inductance between them.

Still another object of my invention is to provide a laminated magnetic core in which particular sections are reduced in effective cross-sectional area by a novel method of stacking the laminations to permit said particular sections to be readily saturated magnetically.

A feature of my invention is the provision of a frequency changer having a voltage regulation characteristic that is substantially flat from no load to full load and drops rapidly thereafter to render the frequency changer self-protecting on overload.

Another feature is a novel method of producing a biasing flux in the magnetic structure of a frequency changer.

Other objects and features will appear upon a further perusal of the specification and the accompanying drawings, in which:

Fig. 7 is a diagram and accompanying set of curves explaining the theory of operation of my frequency changer when used as a frequency multiplier.

Fig. 8 is a diagram and accompanying set of curves explaining the theory of operation of my frequency changer when used as a frequency divider.

Figure 1:
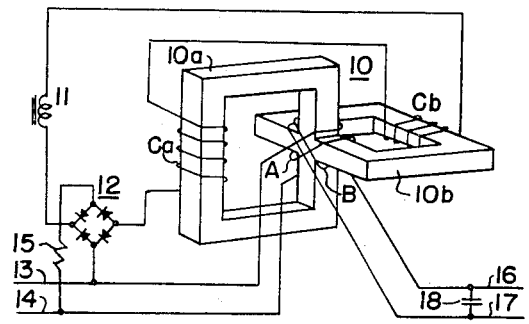
Fig. 1 is a schematic diagram of one form of my improved frequency changer.

In the working of my invention I employ a magnetic core having two intersecting sections, a first coil wound around one pair of diagonally opposite corners of the intersection, and a second coil wound around the other pair of diagonally opposite corners of the intersection. I also provide means for initially magnetizing the several sections of the core to the knee of the saturation curve. To employ my frequency changer as a divider the two intersecting sections are both initially magnetized in the same sense as they are magnetized by the input winding during one-half of the input current wave, but when the frequency changer is used as a multiplier the two intersecting sections are initially magnetized in opposite senses with respect to the magnetization produced therein by the current in the input winding.

First considering the operation of my frequency changer as a multiplier, during one-half of the input current wave the magnetization produced by the input winding tends to increase the flux in one section of the core and to decrease the flux in the second section of the core. Inasmuch as the section in which the flux tends to increase is already saturated there will be substantially no change in the flux in that section while the flux in the second section may decrease greatly or even reverse to the saturation point in the opposite direction. The decrease and return to normal of the flux in one section during one-half wave of input current causes two voltage impulses to be induced in the output winding.

If the change in flux in the second section is less than that required to reach the saturation point in the reverse direction these two voltage impulses form one cycle of twice the input frequency, but if the saturation point in the reverse direction is reached one peaked impulse will be induced in the output winding at the beginning of the half wave of input current and a second peaked impulse having a reversed polarity will be induced in the output winding at the end of the half wave of input current. During the second half wave of input current the flux in the second section remains substantially constant and the flux in the first section is decreased. Two more voltage impulses are then induced in the output winding with polarities corresponding to the first two impulses because the flux in the first section links the output winding in the same direction as the flux in the second section. The two voltage impulses produced during each cycle of the input current wave result in an alternating voltage wave in the output winding having a frequency of twice the input frequency. If the change in flux is sufficient to reach the saturation point in the reverse direction the impulses will have a peaked wave form and under these conditions the output circuit can be tuned to provide an alternating output voltage having a frequency that is any desired even harmonic of the input frequency.

Now considering the operation of my frequency changer as a divider and ignoring the initial magnetization of the two intersecting sections of the core for the moment, energization of the input winding causes it to exert equal magnetizing forces on each of the two sections of the core. If no other magnetizing forces are present equal fluxes will be produced in the two sections. Since the flux flowing in these two sections act differentially upon the output winding there will be no voltage induced therein. Let us assume that by some external means an alternating current having one-half the input frequency is caused to flow through the output winding. The magnetizing forces due to the current in the output winding combined with the magnetizing forces due to the current in the input winding result in similarly distorted but out of phase flux waves in the two sections of the core. If the core is magnetized beyond the knee of the saturation curve the flux waves will be distorted so that their difference will contain a fundamental component having a frequency of one-half the input frequency. Since the two fluxes act differentially on the output winding a voltage of one-half the input frequency will be induced therein. This induced voltage lags the current of the same frequency which it was assumed was caused to flow in the output winding by some external means. By connecting a capacitative reactance across the output winding a current which leads the induced voltage will flow through the output winding and will continue to flow when the external means is removed. When the core is initially magnetized the need for an external means to initiate the flow of subharmonic current is eliminated as will later be described.

The construction and operation of my invention will now be described in greater detail with reference to the accompanying drawings. In Fig. 1 I have illustrated a magnetic core 10 having two sections 10a and 10b which have a portion in common. Such a core may be constructed by winding both sections in the form of spirals from two strips of iron so that the consecutive convolutions of one section lay between the corresponding convolutions of the other section. Coil A is wound around one pair of diagonally opposite corners of the intersection and coil B is wound around the other pair of diagonally opposite corners of the intersection. Two biasing windings Ca and Cb are wound about the two core sections 10a and 10b, respectively. The biasing windings are connected in series with each other and with a choke coil 11 to the D. C. terminals of a full wave dry-disc type rectifier 12 having its A. C. terminals connected to the input leads 13 and 14 in series with resistor 15. The frequency changer is shown connected as a reducer in which case coil A is connected to the input leads 13 and 14 and coil B is connected to the output leads 16 and 17. Condenser 18 is connected across the output circuit. If the frequency changer is to be used as a multiplier the connections of coils A and B are interchanged and condenser 18 may be omitted. Alternatively, the coils A and B may remain connected as shown if the winding direction or the connections of one of the coils Ca or Cb is reversed.

Figure 2:
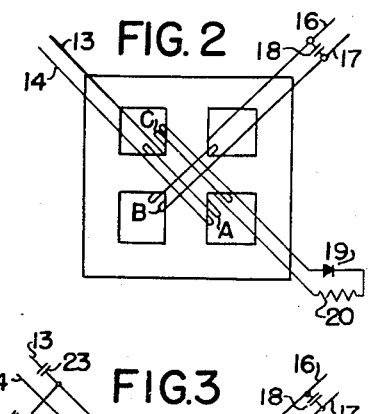
Fig. 2 is a schematic diagram of a modified version of the frequency changer shown in Fig. 1.
Figure 5:
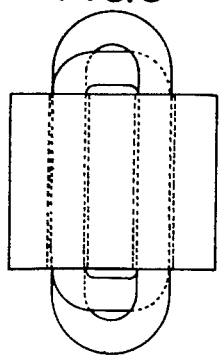
Fig. 5 is a side view of the magnetic structure taken from the bottom of Fig. 4.

The need for two separate biasing windings is eliminated in the modification of Fig. 2 by providing a single coil wound around the same pair of corners of the intersection of the two sections of the core as coil A. The same biasing flux as in Fig. 1 is thus produced in each section of the core with only one-half the number of ampere turns in the biasing winding. The number of ampere turns required of coils A and B to produce a given flux in the two sections of the core is also one-half that which would be required if they were each wound in two sections like coils Ca and Cb of Fig. 1. The amount of wire required is thus reduced, the efficiency is increased by reduction of copper losses, a more compact construction is obtained, and a more efficient magnetic structure may be employed due to the reduced winding space required. Instead of connecting the biasing winding to the input circuit through a rectifier as in Fig. 1, the biasing winding has a rectifier 19 and a resistor 20 serially connected across it. When winding A is connected to a source of alternating current via leads 13 and 14 a corresponding alternating voltage is induced in winding C by transformer action. This voltage is rectified by rectifier 19 and causes a unidirectional current to flow through winding C. The purpose of resistor 20 is to limit the current to the desired value. A choke coil may be used in series with the resistor to smooth the pulsations in current as in Fig. 1 if desired, but the operation has been found to be entirely satisfactory without it.

Figure 3:
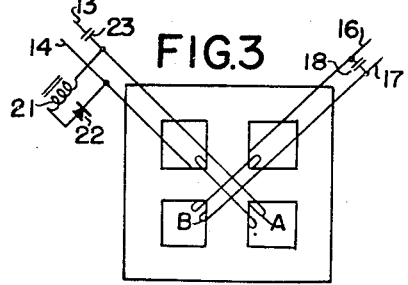
Fig. 3 is a schematic diagram of a modification of Fig. 2.

In Fig. 3 the biasing winding has been eliminated entirely by connecting a rectifier 22 and a choke coil 21 across the input winding A and connecting a condenser 23 in series with the input circuit. This combination causes an alternating current superimposed upon a direct current to flow through coil A. The purpose of condenser 23 is to prevent the direct current from flowing through the alternating current supply circuit.

Figure 6:
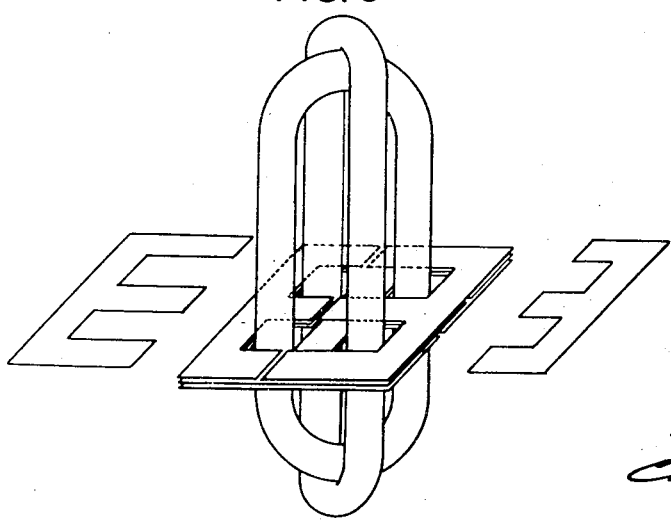
Fig. 6 is a perspective view showing the method of assembling the laminations and coils to produce the structure shown in Figs. 4 and 5.
Figure 4:
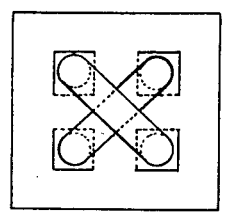
Fig. 4 is a top view showing the construction of the magnetic structure employed in the circuits of Figs. 2 and 3.

To reduce eddy current losses to a minimum the core is preferably built up of thin insulated laminations. These laminations could each be made from a single piece with four openings to receive the windings. This would result in a highly efficient magnetic structure but would require that the coils be hand wound through the openings in the core which would be an expensive and laborious operation. Therefore, the core is preferably constructed from laminations made in two pieces which may be butted together to form a closed H. The coils, which are form wound, are supported at right angles to each other and the laminations are placed as indicated in Fig. 6 to form a symmetrical magnetic core. As illustrated in Fig. 6, the several pieces, which together form a closed H lamination may each be made in the form of an E, one having long legs and the other short legs. The two pieces could be alike or one could be an E and the other a rectangular strip. In any case, half of the laminations would be inserted from the left and right and the other half from the front and rear so that the center legs of the closed H laminations cross at the center of the core. The butt joints are preferably staggered so as to form a symmetrical magnetic structure. It should be noted that the four arms which bridge the center of the core and the midpoints of the sides of the outer square of the core may have only one-half as many laminations as the portions of the core which they bridge, thus permitting these arms to be saturated readily.

While I do not wish to be limited by a theory I will attempt to explain in a simple manner how my frequency changer operates. In Fig. 7 I have shown a set of curves which illustrate the voltage and flux waves produced in my frequency changer when it is operating as a multiplier. The diagram at the left of the curves represents the intersecting portion of the magnetic core and the coils wound thereon. For this mode of operation coil B is connected to a source of alternating current and coil A is connected to a load circuit. I have shown a single biasing winding C connected to a battery in series with a resistor. As previously mentioned, the single biasing winding placed on the core in this fashion is equivalent to the two separate biasing windings shown in Fig. 1. The first curve $E_B$ represents a sine wave of voltage applied to coil B. The flux linking coil B must undergo a sinusoidal variation in order to induce an equal and opposite counter-voltage in coil B. The total flux linking coil B is $\phi_1+\phi_2$. The positive directions were arbitrarily chosen for $\phi_1$ and $\phi_2$ as indicated by the arrows. The total flux $\phi_1+\phi_2$ is shown in the second curve. In the following two curves, $\phi_1$ and $\phi_2$, the dotted line represents the flux which would be produced in the two paths by the biasing winding above. This flux is negative in the case of $\phi_1$ and positive in the case of $\phi_2$. During one-half wave of input current the magnetizing forces produced by coils B and C are aiding in one path and opposing in the second path. During the succeeding half wave of input current they are opposing in the first path and aiding in the second path. Since the path in which the magnetizing forces are aiding is already saturated by the biasing flux there will be little change in flux in that path. The two flux waves indicated by the solid lines in curves $\phi_1$ and $\phi_2$ are thus produced. If $\phi_2$ is subtracted from $\phi_1$ the flux wave $\phi_1-\phi_2$ is obtained which has a frequency double that of the input frequency. The flux linking coil A is $\phi_1-\phi_2$ and it induces a voltage $E_A$ of double the input frequency in coil A. It should be understood that the wave shapes shown have been idealized for simplicity of explanation and that they are actually complex waves of which only the fundamental components have been shown.

Referring now to Fig. 8, which illustrates the operation of my frequency changer as a reducer, coil A is connected to a source of alternating current and coil B is connected to a load circuit in parallel with condenser 18. The positive directions which were arbitrarily chosen for the fluxes $\phi_1$ and $\phi_2$ flowing in the two intersecting sections of the core are indicated by the arrows. If a sine wave of voltage $E_A$ is applied to coil A the flux $\phi_1+\phi_2$ linked by coil A must undergo a sinusoidal variation. As the magnetizing forces produced by coils A and C are aiding in both paths during one-half wave of input current and opposing in both paths during the succeeding half wave, the input current will have the wave shape $I_A$ which is unsymmetrical due to the saturation of both magnetic paths during the half wave when the magnetizing forces are aiding. Now I will assume that a current of one-half the input frequency is flowing through coil B as shown in curve $I_B$. The combined action of current $I_A$ in coil A, current $I_B$ in coil B, and the biasing current in coil C then results in magnetizing forces $H_1$ and $H_2$ in the first and second paths, respectively; as the magnetizing force in the first path is proportional to the ampere-turns in coil A plus the ampere-turns in coil C plus the ampere-turns in coil B, and the magnetiizng force in the second path is proportional to the ampere-turns in coil A plus the ampere-turns in coil C minus the ampere-turns in coil B. These magnetizing forces, $H_1$ and $H_2$, produce flux waves $\phi_1$ and $\phi_2$ in the two sections of the core. If $\phi_2$ is subtracted from $\phi_1$ the flux wave $\phi_1-\phi_2$ results which is a complex wave having a fundamental component of one-half the input frequency. Since the flux which links coil B is $\phi_1-\phi_2$ a voltage $E_B$ will be induced therein by this flux wave. The induced voltage $E_B$ lags the current $I_B$ which it was assumed was flowing in coil B. Condenser 18 will cause a current to flow in coil B which leads the voltage across it by ninety degrees and thus will cause the flow of subharmonic current to be sustained in the output circuit if the induced voltage is high enough to overcome the circuit losses. It should again be noted that the curves shown have been idealized for simplicity of explanation. The actual wave shapes and phase relations are complex and subject to considerable variation with changes in circuit constants. The above relations will remain substantially the same if the biasing winding C is not energized. In this latter case the zero axis will merely be shifted in the curves for $I_A$, $H_1$, $H_2$, $\phi_1$, and $\phi_2$. However, when the biasing winding is energized with unidirectional current the frequency changer is self-starting. The amount of power which can be obtained from the output of the frequency reducer depends upon the value of the unidirectional biasing current and upon the value of condenser 18. With large values of capacity the output voltage remains substantially constant as the load is increased until a point is reached where the output pulsates or stops completely. In the latter case practically all of the load must be removed before the frequency reducer will restart. With smaller values of capacity the output voltage remains substantially constant as the load is increased until a point is reached where the output voltage drops rapidly with increased load. The output voltage will then return to normal as soon as the excess load is removed. This highly desirable voltage regulation characteristic renders the frequency reducer self-protecting on overload and assures normal output as soon as the overload is removed.

In the preceding paragraph it was assumed that a current of one-half the input frequency was flowing in the output circuit initially. I have found that my frequency reducer is self-starting when a biasing flux is produced in the core. One plausible explanation for this effect is that due to slight variations in the characteristics of the two sections of the core there will be a slight difference in the fluxes $\phi_1$ and $\phi_2$, the difference being more pronounced when the degree of magnetization is high. With no biasing flux present voltage impulses will be induced in the output winding during successive half cycles of the input wave due to this difference in fluxes $\phi_1$ and $\phi_2$, but when a biasing flux is used the difference in fluxes $\phi_1$ and $\phi_2$, but when a biasing flux is used the difference in fluxes $\phi_1$ and $\phi_2$ will be substantially reduced during alternate half cycles of the input wave thereby effectively eliminating the voltage impulses in the output winding during alternate half cycles. A circulating current is thus caused to flow through the output winding and condenser 18 with a natural periodicity determined by the capacity of the condenser and the inductance of the output winding. If the natural periodicity of this circuit lies within certain limits the circulating current will be sustained and will lock in step with the input at a subharmonic frequency. Although the curves shown in Fig. 8 only illustrate the operation of my frequency changer to generate the second subharmonic of the input frequency, it should be understood that if the capacity of condenser 18 is sufficiently increased higher order subharmonic frequencies may be generated. Also several frequency reducers may be connected in cascade to obtain a greater reduction in frequency than can be efficiently accomplished in a single unit. It is not necessary that the output circuit be resonant at the output frequency since the natural periodicity of the output circuit does not determine the order of the subharmonic frequency that is produced. For example, it has been found that the capacity of the condenser connected across the output circuit may be varied over a range of five to one without affecting the output frequency when the frequency changer is used to generate the second subharmonic of the input frequency.

It is to be understood that numerous modifications in the details of construction and the combination and arrangement of parts may be resorted to without departing from the spirit and scope of the invention as defined in the subjoined claims.

What is claimed is:

1. In a static frequency changer, a saturable magnetic core including a pair of intersecting members, a first coil wound through one pair of diagonally opposite corners of the intersection, a second coil wound through the remaining pair of diagonally opposite corners of the intersection, a source of alternating current connected to one of said coils, a load circuit connected to the other of said coils, and means for producing a biasing flux in said core, whereby alternating current having a frequency integrally related to the frequency of said source is delivered to said load circuit.

2. In a static frequency reducer, a saturable magnetic core including a pair of intersecting members, a first coil wound through one pair of diagonally opposite corners of the intersection, a second coil wound through the remaining pair of diagonally opposite corners of the intersection, a source of alternating current connected to one of said coils, a load circuit connected to the other of said coils, and a condenser associated with said load circuit to sustain subharmonic currents flowing therein.

3. A frequency changer comprising a saturable magnetic core and a pair of windings thereon, said core having two flux paths which link the whole of said pair of windings in opposite senses, a primary circuit including one of said windings and a source of alternating current, a secondary circuit including the other of said windings and a load, and means for producing a biasing flux in said core to cause alternating current having a frequency which is integrally related to the frequency of said source to be delivered to said load.

4. A static frequency changer comprising a saturable magnetic core and a pair of windings thereon, said core having two flux paths which link the whole of said pair of windings in opposite senses, a primary circuit including one of said windings and a source of alternating current, a secondary circuit including the other of said windings and a load, and a condenser associated with said secondary circuit to sustain alternating currents flowing therein which have a frequency integrally related to the frequency of said source.

5. Electromagnetic induction apparatus for use in a static frequency changer comprising a pair of windings, a first saturable magnetic flux path linking the whole of said windings in one sense, and a second saturable magnetic flux path linking the whole of said windings in an opposite sense, whereby coupling between said windings may be produced by differences in the degree of saturation of said flux paths.

6. A self-starting frequency reducer consisting solely of a saturable magnetic core, a primary circuit including a source of alternating current and a first winding on said core, a secondary circuit including a load and a second winding on said core, means for producing a biasing flux in the core, and a condenser associated with said secondary circuit, said combination producing across said load alternating voltage having a frequency which is a subharmonic of the frequency of said source.

7. A static frequency changer comprising a saturable magnetic core having four openings therein, a first coil wound through one diagonally opposite pair of said openings, a second coil wound through the other diagonally opposite pair of said openings, a source of alternating current connected to one of said coils, a load circuit connected to the other of said coils, and means for producing a biasing flux in said core.

8. A self-starting subharmonic generator comprising a saturable magnetic core having two flux paths, a primary circuit including winding means on said core adapted to produce a magnetic flux in each of said paths when energized by a source of alternating current, a secondary circuit including a condenser and winding means on said core adapted to have opposing voltages induced therein by said two fluxes, and means for producing a biasing flux in said core to initiate the flow of subharmonic current in said secondary circuit.

9. A self-starting subharmonic generator comprising two windings, a first saturable magnetic flux path linking said two windings in one sense, a second saturable magnetic flux path linking said two windings in an opposite sense, a primary circuit including a source of alternating current and one of said windings, a secondary circuit including a condenser and the other of said windings, and means for producing a biasing flux in said paths to initiate the flow of subharmonic current in said secondary circuit.

10. A frequency changer comprising a saturable magnetic core and a pair of windings thereon, said core having a plurality of flux paths which link the pair of windings in one sense and a plurality of flux paths which link the pair of windings in an opposite sense, a primary circuit including one of said windings and a source of alternating current, a secondary circuit including the other of said windings and a load, and means for producing a biasing flux in said core to cause alternating current having a frequency which is integrally related to the frequency of said source to be delivered to said load.

11. A magnetic core structure for use in a static frequency changer comprising a plurality of laminations each having three legs joined by a yoke, said plurality of laminations being assembled with the center legs of some laminations crossing the center legs of other laminations, whereby particular sections of the completed core formed by said center legs have a lesser number of laminations than the remainder of the core to permit said sections to be readily saturated magnetically.

12. In a static frequency changer, a saturable magnetic core including a pair of intersecting members, a pair of windings on said core adapted when energized to produce magnetizing forces which are aiding in one member and opposing in the other member, a source of alternating current connected to one of said windings, a load circuit connected to the other of said windings, and means for producing a biasing flux in said core, whereby alternating current having a frequency integrally related to the frequency of said source is delivered to said load circuit.

13. In a static frequency reducer, a saturable magnetic core including a pair of intersecting members, a pair of windings on said core adapted when energized to produce magnetizing forces which are aiding in one member and opposing in the other member, a source of alternating current connected to one of said windings, a load circuit connected to the other of said windings, and a condenser associated with said load circuit to sustain subharmonic currents flowing therein.

14. A static frequency reducer comprising a saturable magnetic core having four openings therein, a first coil wound through one diagonally opposite pair of said openings, a second coil wound through the other diagonally opposite pair of said openings, a source of alternating current connected to one of said coils, a load circuit connected to the other of said coils, and a condenser associated with said load circuit.

15. A static frequency reducer comprising a pair of coils wound in different planes with their centers substantially coinciding, a saturable magnetic core including four members each of which extends from the center of said coils through a different one of the four openings between the coils, said core having a fifth member joining the extremities of the first four members, a source of alternating current connected to one of said coils, a load circuit connected to the other of said coils, a condenser associated with said load circuit, and means for producing a biasing flux in said core, said combination delivering alternating current to said load circuit at a frequency which is a subharmonic of the frequency of said source.

16. A frequency reducer comprising a saturable magnetic core and a pair of windings disposed thereon in such a manner that no voltage will be induced in either winding when the other winding is excited solely with alternating current, a source of alternating current, means connected between said source and one of said windings for exciting it with superimposed alternating and direct currents, said superimposed currents producing saturation in said core, and an output circuit including a condenser connected to the other of said windings, said connections causing subharmonic currents to be delivered to said output circuit.

17. An electro-magnetic device for use in a static frequency changer comprising a saturable magnetic core and a pair of single section windings disposed thereon so as to have no mutual inductance between them when said core is unsaturated and to have mutual inductance between them when particular sections of said core are saturated.

18. In a static frequency changer, electromagnetic coupling means comprising two single section coils disposed on a common magnetic core so that no mutual induction exists between them when said core is symmetrically magnetized, and means for magnetizing the core unsymmetrically to produce mutual induction between the coils, said mutual induction being produced due to the non-linear permeability of ferromagnetic materials.

19. A frequency changer consisting of a saturable magnetic core and a pair of windings thereon, said windings being so disposed on said core that all of the flux produced therein by current in either of said windings links the other winding but in such a manner that no mutual induction normally exists between the windings, a primary circuit including a source of alternating current connected to one of said windings, a secondary circuit including the other of said windings and a load, and means for producing a biasing flux in said core to produce mutual induction between said windings and thereby cause alternating current having a frequency which is integrally related to the frequency of said source to be delivered to said load.

20. In a static frequency changer, a saturable magnetic core having two flux paths, a first winding on said core adapted when energized to produce balanced fluxes in said two paths, a second winding on said core adapted, if energized, to unbalance the fluxes produced by said first winding, a source of alternating current connected to one of said windings, a load circuit connected to the other of said windings, and means for producing a biasing flux in said core, said biasing flux causing alternating current having a frequency integrally related to the frequency of said source to be delivered to said load circuit.

21. In a static frequency changer, a magnetic core structure having the form of a cross with its extremities connected, and winding means comprising a pair of coils diagonally wound around the cross on said core, one of said coils being energized by alternating current of one frequency to produce alternating current of a different frequency in the other of said coils.

22. In a static frequency reducer, a magnetic core having a plurality of saturable sections, a winding on said core, means including a source of alternating current and said winding for causing an alternating magneto-motive force superimposed on a unidirectional magneto-motive force to act on said core, a second winding on said core for causing a second alternating magneto-motive force of one-half the frequency of said first alternating magneto-motive force to act on said core in such a direction that the combined action of said magneto-motive forces causes the several sections of the core to be saturated at different times whereby an alternating voltage having a component of one-half the frequency of said source is induced in said second winding, and a condenser connected across said second winding for causing said alternating voltage to produce a leading current therein to thereby maintain said second magneto-motive force.

HAROLD J. McCREARY.

REFERENCES CITED

The following references are of record in the file of this patent:

UNITED STATES PATENTS

| Number | Name | Date |
| --- | --- | --- |
| 526,063 | Wagemann | Sept. 18, 1894 |
| 1,667,705 | Von Wysiecki | Apr. 24, 1928 |
| 1,875,250 | McCarty et al. | Aug. 30, 1932 |
| 2,088,619 | Stocker | Aug. 3, 1937 |
| 2,137,433 | Wirz | Nov. 22, 1938 |
| 2,340,382 | Herrick | Feb. 1, 1942 |
| 2,353,511 | Short | July 11, 1944 |
| 2,384,171 | Huge | Sept. 4, 1945 |
| 2,418,643 | Huge | Apr. 8, 1947 |